3,435,260
VIBRATION SENSOR
Harold Seidel, Fanwood, N.J., assignor to Bell Telephone
Laboratories, Incorporated, Murray Hill, N.J., a corporation of New York
Filed June 30, 1966, Ser. No. 562,018
Int. Cl. H01v 7/00
U.S. Cl. 310—8.3        7 Claims

ABSTRACT OF THE DISCLOSURE

A vibration sensor comprising a balanced mechanical reactive bridge in which the incident vibrational signal unbalances the bridge with respect to a high frequency mechanical pumping source to produce a double sideband, suppressed carrier output signal. The mechanical pumping source is mechanically coupled to a second elastic medium in a manner to produce no electrical output from the second medium in the absence of a signal. However, in the presence of a vibrational signal, the coupling is unbalanced, thereby producing an output at the second medium.

Figure 1:
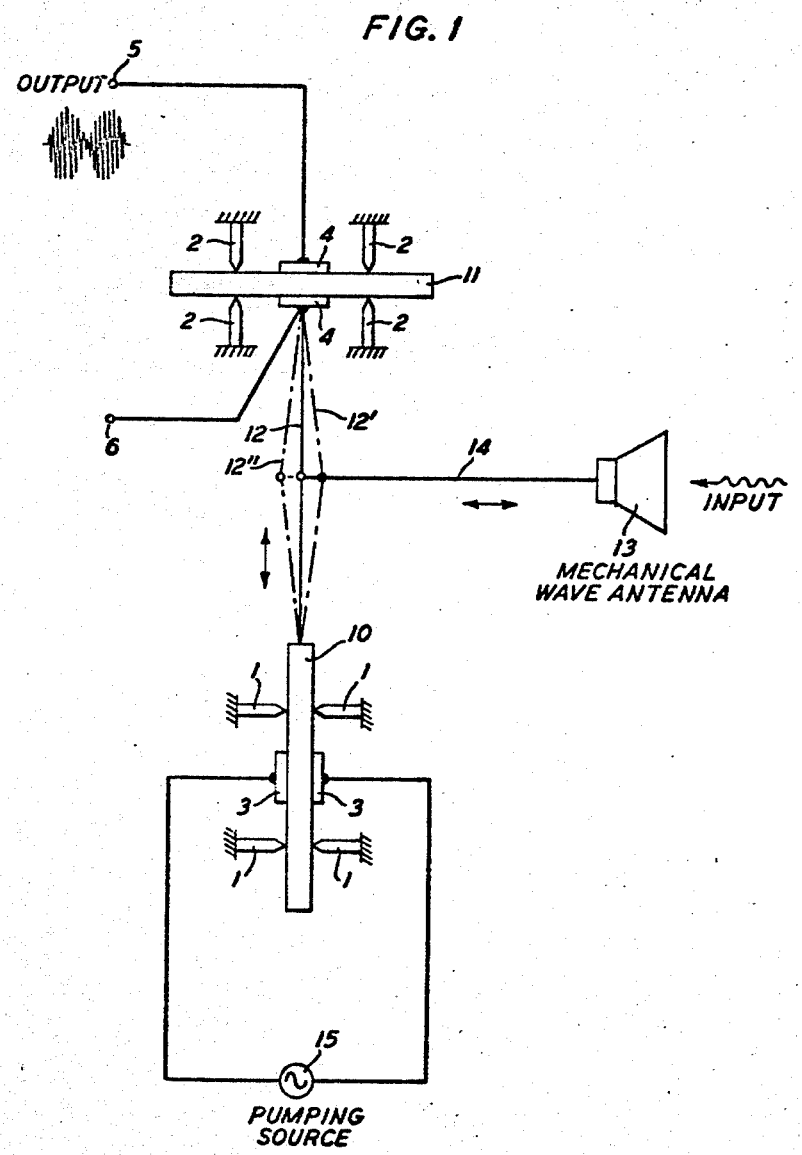

The vibration sensor described has no inherent bandwidth limitations; is a high impedance device; and has a signal-to-noise ratio which increases with decreasing frequency.

---

This invention relates to vibration sensors and, in particular, to low frequency vibration sensors of the type used in underwater sound detection equipment.

The typical sound detector presently employed comprises a diaphragm which directly actuates a piezoelectric transducer. The latter, in turn, develops an electrical output which is coupled into an electronic amplifier. It is a characteristic of such a detection system that the signal-to-noise ratio varies as a third or fourth power of the frequency, resulting in extremely poor low frequency performance.

To compensate for this poor low frequency performance, the practice is to increase the size of the diaphragm so as to capture more of the incident signal energy and, thereby, to increase the signal-to-noise ratio. The result of this practice, however, is to reduce the high frequency response of the system.

This limitation in the performance of the "piezoelectric-electronic amplifier" type of sound detector is fundamental and cannot be improved beyond whatever improvement can be obtained by selecting the best transducer and amplifier.

The present invention avoids the inherent limitation in prior art vibration sensing devices by the application of the principles of parametric amplification. In accordance with the present invention, the incident vibrational signal is mechanically coupled to a balanced, mechanical reactive bridge in a manner to unbalance the bridge with respect to locally applied, high frequency mechanical pumping wave. The effect of introducing an imbalance in the bridge circuit is to produce, in an elastic element of the reactive bridge, a double sideband, suppressed carrier vibrational signal which can then be extracted from the bridge as either an electrical signal or a mechanical signal.

It is an advantage of the present invention that the frequency conversion thus produced introduces at the input to the detection system a power gain that is proportional to the square of the ratio of the pump frequency to the signal frequency. Since the frequency ratio can be of the order of 100 to 1 or greater, available gain of the order of 40 decibels can be realized. Furthermore, this available gain increases as the signal frequency decreases, thus producing a signal-to-noise ratio for the system which increases as the frequency decreases, in contradistinction to prior art sound detectors which are characterized by signal-to-noise ratios which decrease with decreasing frequency.

It is an interesting aspect of the invention that nonlinear (parametric) interaction is produced by mechanical components that appear, at first glance, to be inherently linear elements. This seeming paradox, however, is resolved by the realization that an elastic member of finite length having freedom to move in two or more dimensions is, in fact, nonlinear.

Figure 2:
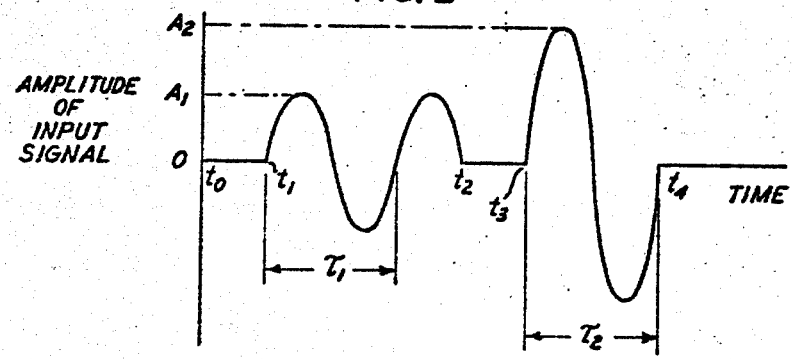
Figure 3:
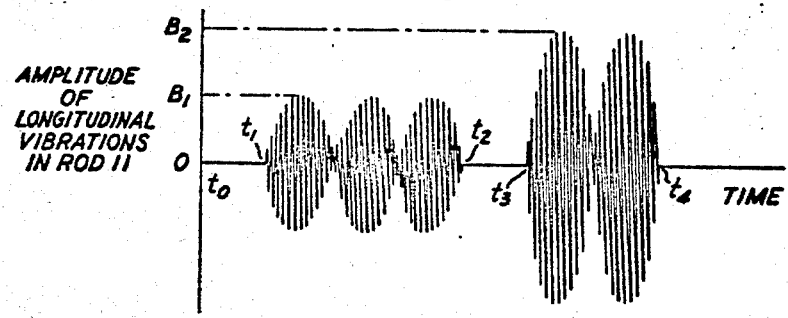
Figure 4:
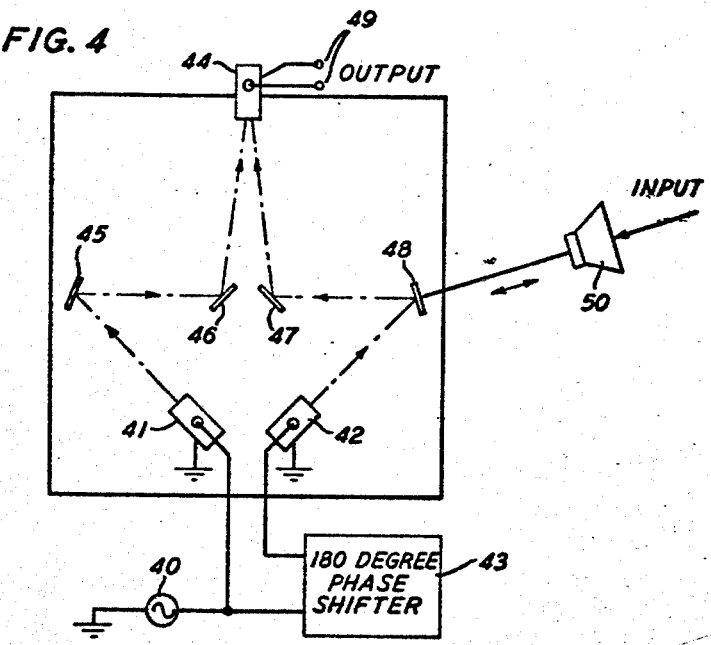

These and other advantages, the nature of the present invention, and its various features, will appear more fully upon consideration of the various illustrative embodiments now to be described in detail in connection with the accompanying drawings, in which:

FIG. 1 is a first illustrative embodiment of a sound detector in accordance with the present invention;

FIGS. 2 and 3, included for purposes of explanation, show the waveshape of the applied signal and the resulting up-converted vibrational signal; and FIG. 4 is a second illustrative embodiment of the invention.

Referring to the drawings, FIG. 1 shows a first illustrative embodiment of the invention comprising first and second rods 10 and 11 mechanically coupled to each other by means of a wire 12. In addition, rods 10 and 11 are mechanically coupled to a mechanical wave antenna 13 by means of a second wire 14 which connects to wire 12 at a point approximately midway between the rods 10 and 11.

Rods 10 and 11 are made of any material capable of supporting longitudinal elastic waves. In the particular illustrative embodiment of FIG. 1, rods 10 and 11 are made of a piezoelectric material in order to permit electromechanical coupling between the rods and associated electrical circuits. For this purpose, rods 10 and 11 can be made of any of the well-known piezoelectric materials such as, for example, quartz, or the ceramic material known as PZT, comprising a mixture of lead zirconate and lead titanate.

Each of the rods is proportioned and supported in a manner to permit the establishment of longitudinal mechanical vibrations therein at the operating frequency. In the illustrative embodiment of FIG. 1, support is provided by means of the four knife edges 1 and 2, located a distance from the rod ends equal to approximately one-quarter of the operating wavelength. In addition, means are provided for exciting mechanical vibrations within rod 10, and for extracting electrical signals from rod 11 when the latter is excited in a preselected (longitudinal) vibrational mode. In this particular embodiment, rod 10 is provided with a pair of metallic electrodes 3 which are symmetrically located along its length and are connected to an electrical pumping source 15. Alternatively, mechanical means can be used to energize element 10. Whatever pumping means are employed, the frequency of the pumping energy is typically of the order of 100,000 kilocycles per second or higher. Since the available power gain of the device is a function of the square of the pumping frequency, the higher frequencies can advantageously be used.

In like fashion, a pair of metallic electrodes 4 are located along the midregion of rod 11. As illustrated in FIG. 1, the electrodes are located on opposite surfaces of the rod and are electrically connected to output terminals 5 and 6.

The two rods are mechanically coupled by means of wire 12 which connects the midpoint of rod 11 to one end of rod 10. When so coupled, and with the rods oriented so that wire 12 is perpendicular to the long dimension of rod 11, longitudinal vibration in rod 10 will not induce longitudinal vibrations in rod 11.

The mechanical wave antenna 13 is coupled to the two rods by means of a second wire 14, one end of which connects to antenna 13, and the other end of which connects to wire 12. Advantageously, wire 14 connects to the midpoint of wire 12, and is directed at right angles to the direction of wire 12.

In operation, a longitudinal acoustic mode of oscillation is induced in rod 10 by pumping source 15, causing the ends of rod 10 to vibrate back and forth as the longitudinal dimension of rod 10 alternately increases and decreases. This vibration is communicated to rod 11 by means of wire 12 as the tension in the wire alternately increases and decreases. However, because wire 12 is oriented in a direction perpendicular to the long dimension of rod 11, there is essentially no component of motion directed along the long dimension of rod 11 and, hence, no longitudinal vibrations are induced therein. As a consequence of the location of electrodes 4, the absence of longitudinal vibrations in rod 11 results in no electrical signal across output terminals 5 and 6. If, now, antenna 13 is simultaneously set in motion by means of an input signal, an additional virbrational component is introduced at rod 11. Referring to FIG. 1, longitudinal vibrations induced in antenna 13 by the signal wave are communicated to wire 12 by means of wire 14, causing a displacement of wire 12 in the direction parallel to the long dimension of rod 11, as indicated by the dotted lines 12' and 12". As a result of this displacement of wire 12, a longitudinal component of energy at the pumping frequency is coupled into rod 11, inducing longitudinal vibrations therein. The amplitude of these vibrations, and the interval of time over which they exist are a function of the amplitude and duration of the input signal. To illustrate, FIG. 2 shows a particular input signal consisting of one and a half cycles of a sinusoidal wave of period $\tau_1$ and maximum amplitude $A_1$, followed by an off period from time $t_2$ to $t_3$, and one cycle of a second sinusoidal wave of period $\tau_2$ and maximum amplitude $A_2$. FIG. 3 shows the variations in the amplitude of resulting vibrations induced in rod 11 during the corresponding time intervals. For example, during the period $t_0$ to $t_1$ the signal amplitude is zero and, hence, there is no displacement of wire 12 and no longitudinal vibrations induced in rod 11. At time $t_1$ the signal amplitude begins to increase, reaching a maximum $A_1$ at time $t_1 + \tau_1/4$. Correspondingly, the longitudinal vibrations at the pump frequency produced in rod 11 increase and reach a maximum $B_1$. A quarter of a cycle later, as the input signal passes through zero amplitude, wire 12 returns to its at-rest position and the vibrations in rod 11 also decrease to zero amplitude. During the second half cycle of the input signal, wire 12 is displaced in the opposite direction, again causing vibrations to be induced in rod 11 that are 180 degrees out of phase with those that had been induced during the first half cycle of the signal wave. The correspondence between the signal wave and the amplitude and duration of the vibrations induced in rod 11 can be readily seen from FIGS. 2 and 3.

From the above description it is seen that any vibrational signal impinging upon antenna 13 causes a tilting in the direction of wire 12 at rod 11 by an amount proportional to the amplitude of the incident signal. This induces longitudinal excitation in rod 11 that is proportional to the cosine of the tilt angle, and an electrical output from rod 11 that is proportional to $F(t) \sin \omega_p t$. It will be noted that this is exactly the form of a double sideband modulation, where the modulation, $F(t)$, is the pressure applied to the antenna by the signal as a function of time.

From the Manley-Rowe relationships, the available gain produced by the above-described system is proportional to $$(\omega_p/\omega_s)^2$$

where $\omega_p$ is the pump frequency, $\omega_s$ the signal frequency. Thus, the pumped spring has operated as a parametric converter, producing large, frequency insensitive power gain.

In the embodiment of FIG. 1, rod 11 is made of a piezoelectric material and the output signal is taken as an electrical output. It is apparent, however, that the vibrations in rod 11 can, alternatively, be retained in mechanical (phonon) form for further phonon amplification and utilization without being converted into an electrical signal. This is noted merely to show that there is an option in the manner of treatment of the up-converted output energy.

A particular feature of the embodiment of FIG. 1 is that the restoring force of wire 12 is intrinsic to the mode of operation of this form of amplifier, and as this restoring force produces zero velocity at zero frequency, the amplifier has infinite zero frequency impedance. As the signal frequency increases, this impedance decreases. However, it can be made high at the upper limit of the signal band by increasing the wire tension and sho: ning its length. This is desirable for underwater applications where an impedance match to a high impedance is sought.

FIG. 4 is a second illustrative embodiment of the invention in which the pumping energy, derived from a pumping source 40, is applied to two transducers 41 and 42, 180 degrees out of phase. This is done by placing a 180 degrees phase shifter 43 in the line connecting source 40 to one of the transducers 42.

The two vibrational waves produced by transducers 41 and 42 are directed upon a third transducer 44 by means of reflectors 45, 46, 47 and 48. By making the path lengths between each of the transducers 41 and 42 and transducer 44 equal, the two waves arrive at transducer 44 out of phase, inducing no vibrations in transducer 44 and, thus, producing no net signal at output terminals 49. If, however, an input signal is applied to a diaphragm 50 attached to one of the reflectors 48, the latter is caused to vibrate, thereby modulating one of the two path lengths. As a consequence, the two pumping wave components incident upon transducer 44 are no longer out of phase. This produces an increase in the amplitude of the net pumping wave impinging upon transducer 44 from zero to some finite value, depending upon the amplitude of the input signal. Correspondingly, an up-converted output signal is produced at terminals 49.

To produce efficient coupling between the transducers, they are advantageously immersed in a liquid bath.

It is understood that the above-described arrangements are merely illustrative of but two of the many possible specific embodiments which can represent applications of the principles of the invention. For example, the embodiment of FIG. 1 can be modified to permit rod 11 to move transversely. The pumping energy is then applied to rod 11 along with the mechanical input signal, while the output signal is extracted from across rod 10. This latter arrangement has the interesting property that in the absence of an input signal, an output signal is obtained from across rod 10 at twice the pumping frequency. Accordingly, a second harmonic filter is advantageously placed in the electrical output circuit of this embodiment. FIG. 4 can be modified by energizing the two transducers 41 and 42 in phase, and then making the two path lengths differ by 180 degrees. In addition, transducers 41 and 42 can be energized by mechanical means rather than by electrical means. Thus, numerous and varied other arrangements can readily be devised in accordance with these principles by those skilled in the art without departing from the scope and spirit of the invention.

What is claimed is:

1. In combination:

first and second elongated rods of piezoelectric material;

means for inducing longitudinal elastic oscillations along the long dimension of the first of said rods;

flexible mechanical coupling means connecting an end of said first rod to the midpoint of said second rod; said coupling means extending away from said second rod in a direction perpendicular to the long dimension of said second rod;

means responsive to an elastic input signal for changing the direction of said coupling means;

and electrical output means connected to said second rod for detecting longitudinal elastic oscillation induced in said second rod.

2. In combination:

first and second elastic media;

means for inducing elastic wave oscillations in said media at the same frequency;

a third elastic medium;

mechanical means coupling each of said first and second media to said third media characterized in that the components of wave energy coupled from said first and second media and incident upon said third medium are 180 degrees out of phase;

mechanical means for modulating the relative phase of said components of wave energy;

and means for deriving an output signal from said third medium in response to said modulation.

3. The combination according to claim 2 wherein the oscillations in said first and second media are induced 180 degrees out of phase.

4. The combination according to claim 2 wherein the oscillations in said first and second media are induced in phase;

and wherein said mechanical coupling means introduce a 180 degree phase shift in the energy components coupled from said first and second media to said third medium.

5. In combination:

a rod supportive of elastic waves;

output means, responsive to a predetermined mode of elastic waves, associated with said rod;

a mechanical pumping source;

first means for mechanically coupling said pumping source to said rod in a manner to induce no response in said output means;

a mechanical wave antenna for sensing mechanical disturbances;

second means for mechanically coupling said antenna to said first coupling means;

characterized in that:

any mechanical disturbance sensed by said antenna causes a perturbation of said first coupling means, thereby inducing a component of said predetermined mode of elastic wave in said rod and a corresponding output signal in said output means.

6. The combination according to claim 5 wherein said rod is made of a piezoelectric material;

and wherein an electrical output signal is produced by said rod.

7. A vibrating sensor comprising a source of mechanical vibrations, an output transducer, mechanical means connecting said source to said output transducer such that said output transducer is isolated from said source and produces no output signal, a movable member responsive to an external signal disposed along and integral with said connecting means characterized in that an external signal applied to said movable member disturbs said connecting means to produce an output signal at said output transducer proportional to said external signal.

References Cited

UNITED STATES PATENTS

| 3,127,527 | 3/1964 | Elston | 310—8.6 |
| 3,274,539 | 9/1966 | Sykes | 310—8.0 |
| 3,304,773 | 2/1967 | Rogallo | 310—8.5 |
| 3,341,721 | 9/1967 | Vincent | 310—8.6 |
| 3,354,426 | 9/1967 | Massa | 310—8.5 |
| 3,360,770 | 12/1967 | Friedman | 310—8.6 |
| 3,363,139 | 1/1968 | Schiavone | 310—8.7 |

J. D. MILLER, *Primary Examiner.*

U.S. Cl. X.R.

310—8.1, 8.5, 8.7, 9.1; 333—30; 340—10